(12) United States Patent
Smith et al.

(10) Patent No.: US 9,994,363 B1
(45) Date of Patent: Jun. 12, 2018

(54) LIQUID LAUNDRY DETERGENT REFILL SYSTEM AND METHOD

(71) Applicant: Selestial Soap, LLC, Traverse City, MI (US)

(72) Inventors: Ruth A. Smith, Zeeland, MI (US); Stephen J. Ezell, Traverse City, MI (US)

(73) Assignee: Selestial Soap, LLC, Traverse City, MI (US)

( * ) Notice: Subject to any disclaimer, the term of this patent is extended or adjusted under 35 U.S.C. 154(b) by 0 days. days.

(21) Appl. No.: 14/751,252

(22) Filed: Jun. 26, 2015

(51) Int. Cl.
*B65D 1/02* (2006.01)
*B65D 27/00* (2006.01)

(52) U.S. Cl.
CPC ............. *B65D 27/00* (2013.01); *B65D 1/02* (2013.01)

(58) Field of Classification Search
CPC .................................. B65D 1/02; B65D 1/0207
USPC .............. 206/568, 229, 223, 219; 220/23.83, 220/23.86, 23.8; 215/400, 6, 398, DIG. 8
See application file for complete search history.

(56) References Cited

U.S. PATENT DOCUMENTS

| | | | | |
|---|---|---|---|---|
| RE33,646 E | * | 7/1991 | Klemm | C11D 17/047 206/219 |
| 5,960,973 A | * | 10/1999 | Markson | G09F 3/04 215/386 |
| 6,655,527 B1 | * | 12/2003 | Rubin | A01N 59/14 206/223 |
| 8,070,016 B2 | | 12/2011 | Kawakami et al. | |
| 8,973,822 B2 | | 3/2015 | Brown | |
| 2003/0051767 A1 | * | 3/2003 | Coccaro | B65D 1/02 141/351 |
| 2003/0051945 A1 | | 3/2003 | Coccaro et al. | |

OTHER PUBLICATIONS

Author unknown, www.google.com web page, (1page) dated Sep. 9, 2016.*
Author unknown, www.amazon.com web pages, (9 pages) dated Sep. 9, 2016.*

* cited by examiner

*Primary Examiner* — Stephen Castellano
(74) *Attorney, Agent, or Firm* — Northern Michigan Patent Law, PLC

(57) ABSTRACT

A system and method for supplying liquid laundry detergent refills to a consumer. A new empty refillable original laundry jug or container made of plastic or similar is sold with a small, lightweight first-use pouch of water-soluble laundry detergent pre-mix as a unit at a retail point of purchase. A separate supply of refill pouches of the pre-mix powder are available for purchase at any time after or separately from the original purchase of the original new empty jug. A consumer only needs to purchase the new empty refillable jug (with its included first-use pouch) once; subsequent refill pouches are purchased without a jug, and used to make an unlimited number of liquid refills in the originally purchased jug.

2 Claims, 3 Drawing Sheets

LIQUID LAUNDRY DETERGENT REFILL SYSTEM AND METHOD

RELATED APPLICATIONS/PRIORITY BENEFIT CLAIM

Not applicable.

FIELD

The subject matter of the present application is in the field of liquid laundry detergents, soaps, cleaners and the like, dispensed from a plastic jug or similar container for household use.

BACKGROUND

Liquid laundry cleaning and treating products are commonly sold in pourable plastic bottles or jugs for household use, and include, for example, liquid detergents, soaps, and fabric softeners. The numbers of such plastic jugs sold in just the United States in a given year is estimated at a billion. The plastic jugs are usually recycled or thrown away, requiring large amounts of energy and/or landfill space. Additionally, consumers pay for a new jug with every purchase of the liquid detergent.

U.S. Pat. No. 8,973,822 to Brown shows a vending machine or "self-service refill station" for refilling a plastic bottle with liquid laundry detergent (or other fluid products) at a store where the original purchase was made.

U.S. Pat. No. 8,070,016 to Kawakami et al show a refill pouch with a nozzle structure designed to pour refills such as detergent, bleach, softening agent, laundry starch, shampoo, conditioner, or the like into a refillable plastic or glass container with a stable flow. The refill pouches are believed to hold a volume of refill material comparable to the volume of the bottle being refilled, as it would be desirable to keep the number of disposable refill pouches to a minimum for the life of the refillable container. The nozzle and pouch structure are also designed to minimize the bulk of the pouch for packing and shipping versus earlier three-dimensional pouch designs. Perishable food refills are also contemplated, as a storability-enhancing laminated film construction is suggested for a seasoning refill pouch.

BRIEF SUMMARY

The present invention is a system and method for greatly reducing plastic waste associated with laundry detergent jugs, and improving the cost and ease with which a consumer can buy laundry detergent. "Laundry detergent" will be used as shorthand herein for various household laundry cleaning liquids including but not limited to detergent, soap, fabric softener, color brightener, and the like, poured from a jug or bottle.

The inventive system comprises a new empty refillable jug with a grip or handle portion and a cap or closure; a small first packet or pouch of water soluble laundry agent premix in dry or liquid concentrate form (powder, granules, flakes, beads or any other liquid or non-liquid form) packaged with the new empty refillable jug, significantly smaller in volume than the volume of the jug, and sufficiently concentrated when mixed with a volume of water corresponding to the volume of the jug to fill the jug with a multi-serving quantity of laundry detergent; and, a separate supply of premix refill pouches available for separate purchase by a consumer re-using the original empty refillable jug.

"Jug" is used herein to mean any substantially rigid, refillable, reusable fluid bottle or similar container with a cap or closure and a handle or grip portion sufficient to agitate the premix agent with water therein. The jug is preferably made of a durable recyclable plastic, although other materials would be possible.

"Pouch" as used herein should be construed to include not only flexible packets and the like, but small vials or other small rigid containers capable of holding the premix agent and being packaged with the original empty refillable jug or sold separately at a point of purchase.

"Plastic" is used herein to denote various known polymer materials of the type commonly used for laundry detergent jugs, including but not limited to materials such as recyclable polyethylene or polypropylene.

The method comprises providing a new empty refillable jug at a consumer retail point of purchase location; providing a small first pouch of water soluble laundry agent premix (powder, granules, flakes, beads or any other liquid or non-liquid form) with the new empty refillable jug for sale as a combination unit at the consumer retail point of purchase location, the pouch significantly smaller in volume than the volume of the jug, and sufficiently concentrated when mixed with a volume of water corresponding to the volume of the jug to fill the jug with multi-serving laundry cleaning fluid; and, providing a separate supply of premix refill pouches for separate purchase by a consumer who is re-using the original new empty refillable jug. In a further form the method includes purchasing a premix refill pouch from the separate supply, and mixing the contents of the premix refill pouch with a refill volume of water in the original new empty refillable jug at a consumer point of use (e.g., a household).

These and other features and advantages of the invention will become apparent from the detailed description below, in light of the accompanying drawings.

DETAILED DESCRIPTION

Figure 1:
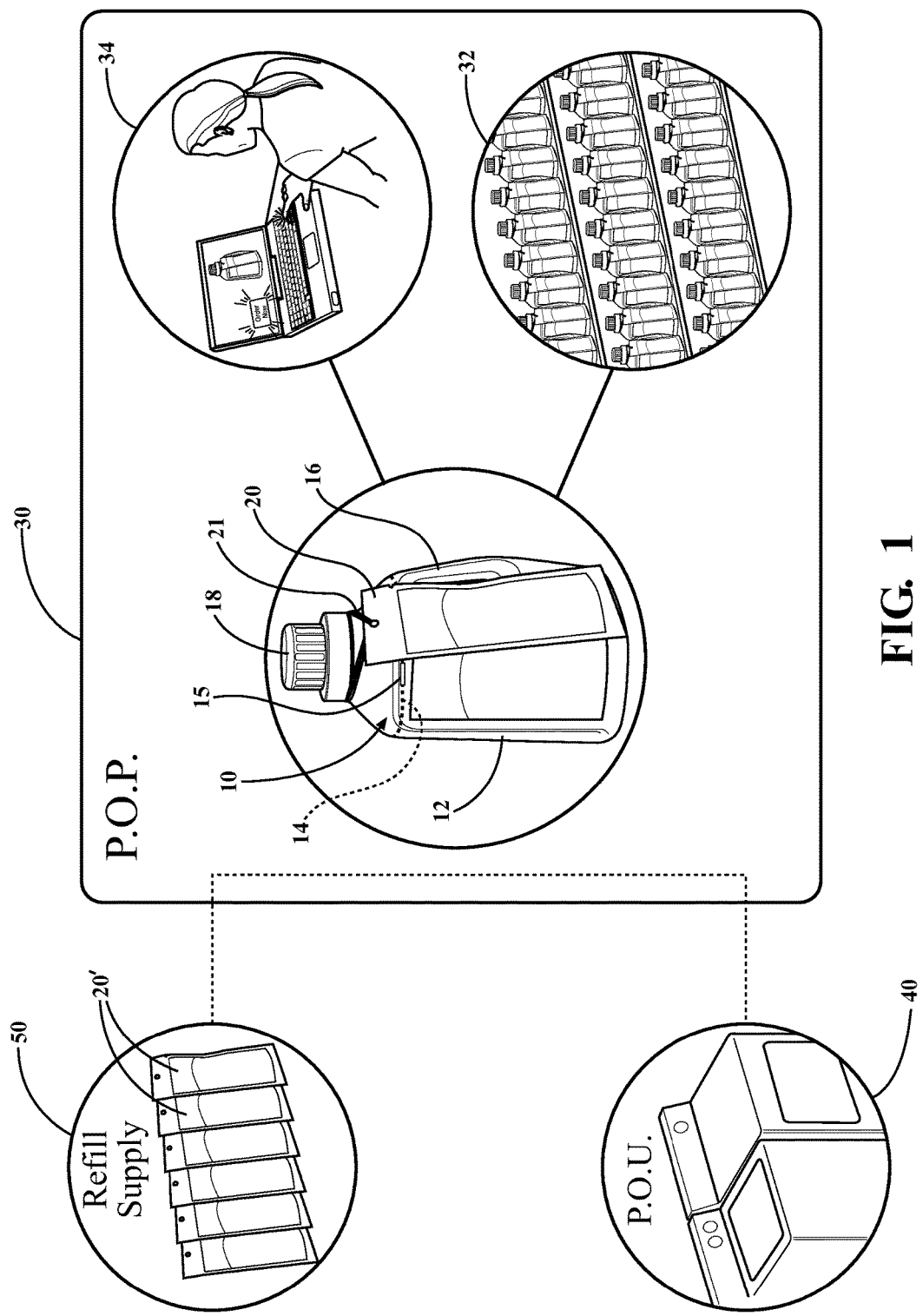
FIG. 1 is a schematic diagram of a laundry detergent refill system according to the invention, including a consumer retail point of purchase and a consumer point of use.

Referring first to FIG. 1, a system and method for providing and refilling a refillable laundry detergent jug with liquid detergent is shown in exemplary form in order to teach how to make and use the claimed invention. A new, empty original laundry jug 10 of conventional structure and material is shown at a consumer retail point-of-purchase location ("purchase location") 30. Jug 10 comprises a main body 12 defining an internal fluid volume 14, a handle or grip portion 16, and a cap or closure 18 of known type. Jug 10 may vary in details such as size or shape or volume, or container material, but in the illustrated example is a conventional plastic laundry detergent jug of approximately fifty ounces in fluid-containing volume, with a spout 19 (FIG. 2) from which liquid detergent can be poured into a washing machine when the cap is open or removed. The cap may be any type of re-useable, re-sealable closure capable of remaining liquid-tight, especially if the jug is shaken to mix the contents. The handle or grip may take different forms, including contoured or textured surfaces on the main jug body rather than a protruding handle as shown, to assist with pouring and shaking.

Figure 2:
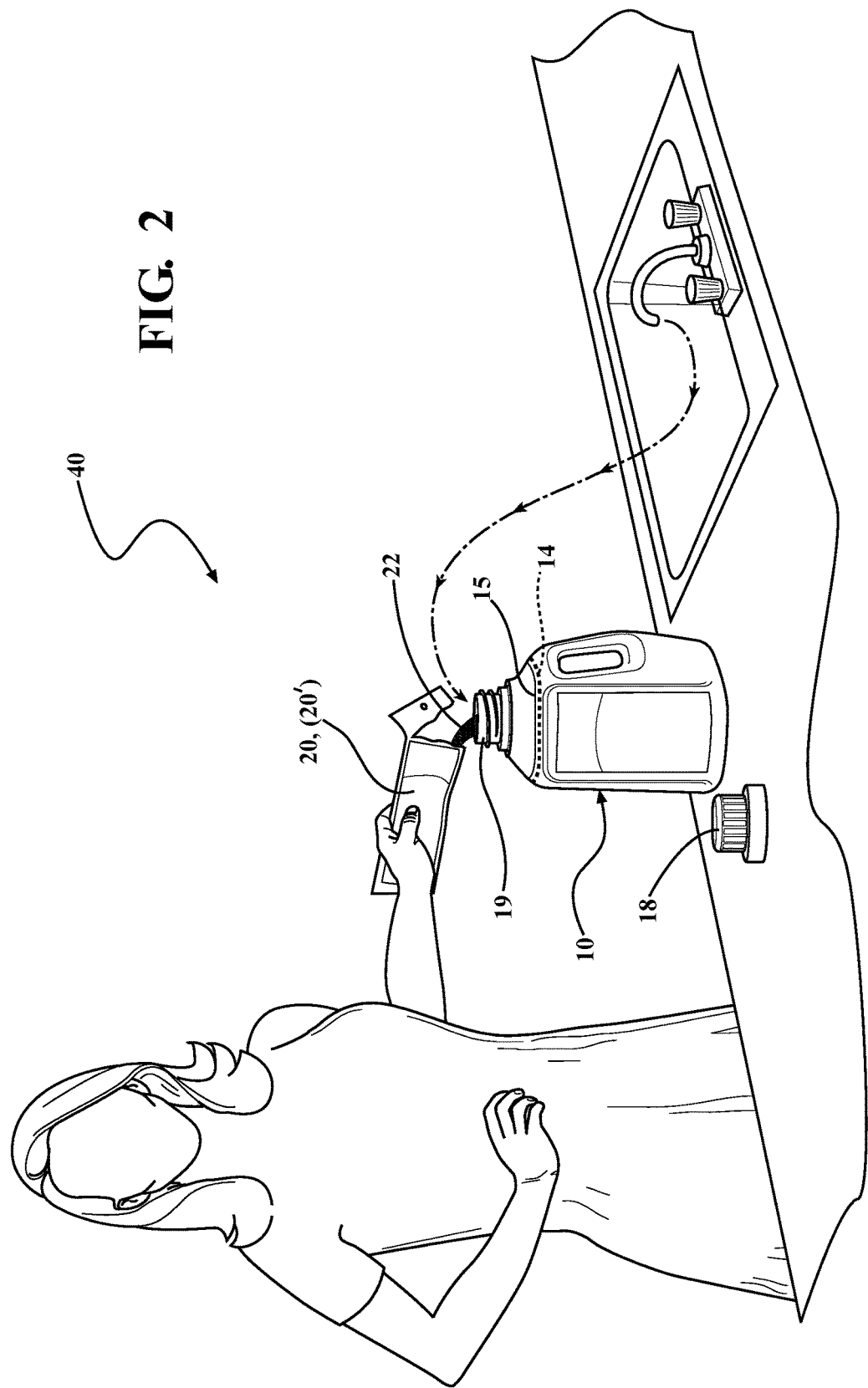
FIG. 2 is schematically represents a consumer filling or re-filling a jug with a laundry pre-mix packet and water to make a jug-full of laundry detergent liquid.

Jug 10 is provided for sale at a purchase location 30 in combination with a packet or pouch 20 of laundry detergent pre-mix 22 (FIG. 2). Pre-mix 22 is a water soluble dry or liquid mix material (powder, granules, beads, flakes, liquid concentrate, etc. designed and measured to be mixed with a specified volume of water in jug 10 sufficient to make a substantially full jug of liquid laundry detergent, e.g. roughly fifty ounces in the illustrated jug. In the illustrated example, pre-mix 22 is approximately two and a half ounces of a laundry soap-making mixture of sodium carbonate, sodium bi-carbonate, sodium chloride, tetra sodium salt, and sodium citrate, although this formulation for the example of laundry soap is exemplary only, and other formulations are possible.

For refill measuring purposes, jug 10 may have internal and/or external fill indicator markings 15 of known type, visible to a person filling the jug so that the correct amount of water is added for mixing with the pre-measured quantity of pre-mix 22 from pouch 20.

Pouch 20 in the illustrated example is a disposable or recyclable paper pouch with the pre-mix 22 sealed inside for shipping and storage. One possible material for pouch 20 is biodegradable rice paper. Other known, possible materials for the pouch include conventional paper, foil, dissolvable films and plastic film. The size and volume of pouch 20 are significantly smaller than jug 10, for example the pouch being fairly flat, five or six inches long, and holding around one to thirteen ounces of pre-mix. The relative sizing of the jug 10 and pouch 20 may vary, and the relative proportions of the jug and pouch shown in the drawings are representative examples, but are not limited to the above mentioned dimensions Pouch 20 and new empty jug 10 are combined or packaged and sold as a unit to a consumer at purchase location 30, for example by physically connecting pouch 20 to jug 10 with string 21 as shown, or with easily-removed adhesive, mechanical connectors, or packaging material such as paper or plastic wrap securing them together. Illustrated pouch 20 is optionally small enough to fit inside the empty new jug 10 through spout 19 to make a unit, and is easily retrieved after purchase by simply removing the cap and extracting the pouch out of the empty (except for the pouch) jug. Alternately, a physically separate pouch 20 may be sold immediately adjacent or with the new empty jug 10, for example on an adjacent or associated point of purchase display, whether real/physical or virtual/on-line; in this sense the pouch sold with the original new jug is "connected" or combined with the jug by virtue of it being a common, single retail sale of the original jug and the first pouch as a unit. Alternately, the pre-mix can be pre-loaded into the original empty jug for initial sale therewith, for example contained in a dissolvable pouch that does not need to be extracted for mixing, or inserted directly into the jug, i.e. uncontained by a pouch; a jug sold with such a pre-loaded initial quantity of pre-mix 22, or an inserted pouch 20, will still be considered "empty", since it contains only the small amount of pre-mix that takes up a minimal portion of the jug's volume, approximately 3-12%, leaving a large majority of the jug's volume empty. Pouch 20 first sold with the new empty jug 10 (or any pre-loaded initial quantity of pre-mix in the jug corresponding to the contents of a pouch) will be referred to as a "first use" pouch.

Regardless of the purchase location, jug 10 is originally made available and sold or shipped to the consumer as a new, empty jug (with "new" including clean recycled jugs). The light weight and empty nature of the new empty jug 10 greatly facilitates both distributor and mail-order shipping; reduces shipping energy and cost; and provides an immediately tangible indicator to the consumer at the time of purchase (handling on the store shelf, opening the delivery box, reading a description or viewing a video on-line and imagining the heft) that the inventive laundry system is eco-friendly and intended for refilling at home.

The small volume of pre-mix 22 in pouch 20 also reduces weight and simplifies shipping. Dry pre-mix especially is also easier and less messy for a consumer to use at home when making a batch of liquid detergent, and leaves little or no residue on the pouch material after being emptied.

Purchase location 30 is a retail source for the consumer to purchase a new empty jug 10 and first-use pouch 20. Purchase location 30 may be a local retail store 32 where the consumer makes the purchase in person, or a retail mail order or delivery business 34 accessed remotely by a consumer to make a purchase—for example via an internet website using a computer (e.g., desktop, laptop, mobile device) or by mail or phone.

The consumer point-of-use 40 is the household or equivalent where the consumer intends to mix the pre-mix 22 with the appropriate quantity of water in jug 10 to make a new jug-full of liquid detergent. The point-of-use 40 may be a self-sufficient household with its own laundry facilities, or it may include a separate laundry location such as a local laundromat near the household where the consumer mixes and/or uses the liquid detergent. The point-of-use 40, however, will typically be where the liquid detergent made from water and pre-mix 22 in jug 10 is made and/or stored by the consumer for ready access on laundry day.

Still referring to FIG. 1, refill supply point 50 is a retail source of one or more refill pouches 20' available to the consumer as a separate or distinct purchase. Refill supply point 50 in FIG. 1 is illustrated schematically as being distinct from the original jug point-of-purchase 30, either as a physically remote or distinct location or source relative to jug purchase location 30 (different store, different website, different catalog, etc.); or, the same location or source as original jug purchase location 30 (same store, same website, same catalog, etc.), but offered separately without an accompanying new empty jug 10. Refill supply point 50 is therefore a distinct, separate purchasing offer/event relative to the offer and sale/purchase of the combination of the original empty new jug 10 and first-use pouch 20, for example: where refill supply point 50 is a physically or commercially different retail outlet from original jug purchase location 30; where refill supply point 50 is a purchase later in time from the same purchase location 30, for example after the original, first-mixed batch of liquid laundry detergent in jug 10 is used up; or, if refill supply point 50 is a separate purchase at the same time from the same purchase location 30, for example where a consumer buys the empty new jug 10 and its combined first-use pouch 20, and also buys a supply of one or more refill pouches 20' in anticipation of refilling jug 10 after the initial mixed batch of liquid detergent is used up.

Figure 3:
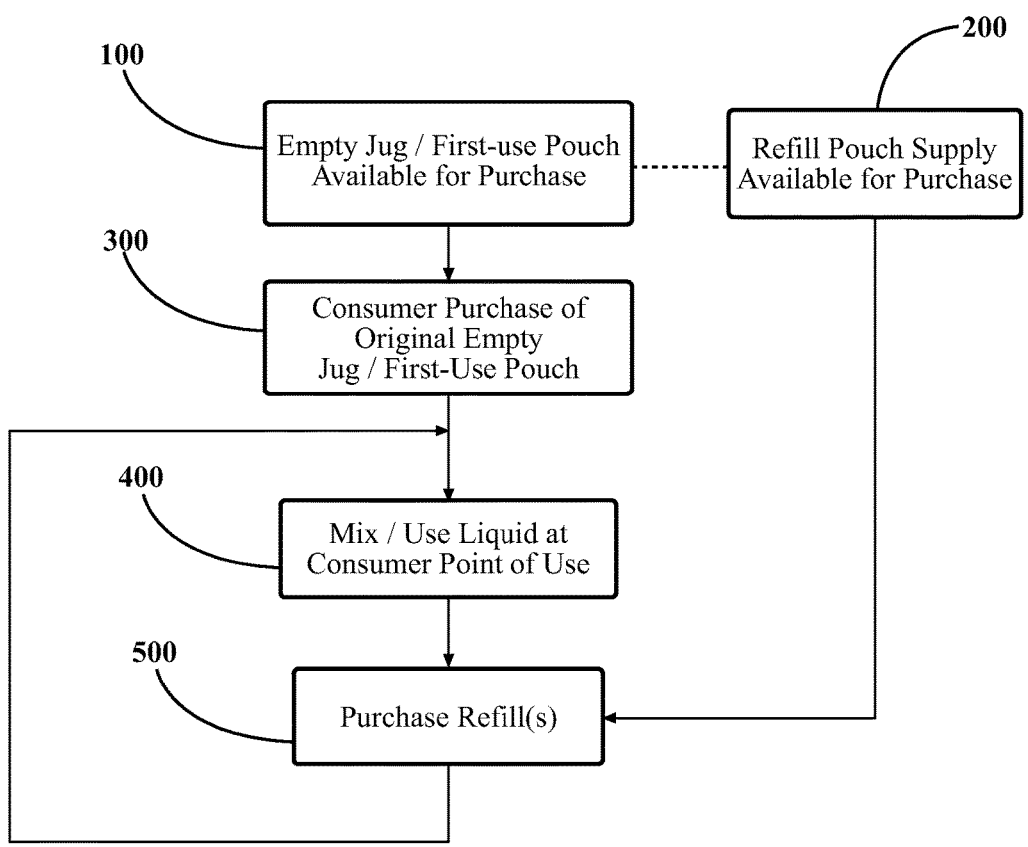
FIG. 3 is a schematic flow diagram of a laundry detergent refill method using the system of FIG. 1.

FIG. 3 is a schematic flow diagram representing a process according to FIG. 1. At 100 a new empty jug 10 and associated first-use pouch 20 are provided at a retail purchase location for purchase by a consumer. At 200 a supply of one or more refill pouches 20' is provided and made available at a retail purchase location for a distinct, typically later-in-time purchase, without an accompanying new empty jug. (The broken line connecting 100 and 200 represents the option of providing the refill pouch supply at the original purchase location 30 for separate purchase.) At 300 a consumer purchases new empty jug 10 and first-use pouch 20 at purchase location 30. At 400 the consumer mixes the contents of the first-use pouch 20 with a recommended quantity of water in new empty jug 10 at household/consumer point of use 40 to make a batch of liquid laundry detergent. At 500 the consumer purchases one or more of the refill pouches 20' from the refill pouch supply at 200 (whether from the original jug purchase location at 100 or from a different source), at which point the loop returns to 400 where the consumer mixes a new batch of liquid laundry detergent in the original new empty jug 10 using the pre-mix from a refill pouch 20' and water from a household faucet, tap, spigot, etc.

It should be clear from the foregoing in FIG. 3 that the consumer will typically only need to make a jug purchase at 300 once in a very long time, as long as the original new empty jug 10 remains useful for mixing and storing liquid laundry detergent, which could potentially be a lifetime of use with proper care. Thus, the process remains a closed loop until jug 10 wears out or is lost.

It should be understood that the process is not limited to the same consumer both purchasing and using the same new empty jug 10, since a first consumer could buy a new empty jug 10 and first-use pouch 20 and then make a gift of the combination to a second consumer. Both are contemplated in the illustrated process of FIG. 3.

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A refillable laundry liquid system comprising:
    an empty refillable original jug comprising a grip or handle portion and a removable and resealable liquid-tight closure suitable for closing the empty refillable original jug for mixing a liquid therein by agitation of the empty refillable original jug and for storage of a liquid detergent therein between washes;
    a first-use pouch of water soluble laundry agent premix combined with the empty refillable original jug as a retail original purchase unit at a first consumer retail purchase location, the first-use pouch being significantly smaller in volume than a full volume of the empty refillable original jug, and the pre-mix being sufficient when mixed with a volume consisting only of water corresponding to the full volume of the empty refillable original jug to fill the empty refillable original jug with a multi-serving quantity of storable liquid laundry detergent capable of treating multiple loads of laundry; and,
    a separate refill pouch supply comprising at least one refill pouch substantially identical in volume and contents to the first-use pouch and comprising a separate retail purchase unit,
    wherein the first-use pouch is physically connected to an exterior portion of the empty refillable original jug.

2. The system of claim 1, wherein the first-use pouch is physically combined with the empty refillable original jug exteriorly thereto at the first consumer retail purchase location.

\* \* \* \* \*